United States Patent
De Andrade Cajahyba et al.

(10) Patent No.: US 9,575,776 B2
(45) Date of Patent: Feb. 21, 2017

(54) SYSTEM FOR ORGANIZING AND GUIDING A USER IN THE EXPERIENCE OF BROWSING DIFFERENT APPLICATIONS BASED ON CONTEXTS

(75) Inventors: Tiago Silveira De Andrade Cajahyba, Salvador-BA (BR); Alexandre Bader Krafzik, Campinas, SP (BR); Eduardo Manuel De Freitas Jorge, Salvador-BA (BR); Alberto Almeida De Azevedo Filho, Lauro de Freitas-Bahia (BR); Fernando Campos Martins, Salvador-BA (BR); Ana Lúcia Lage Pereira, Salvador-BA (BR); Talmai Brandão De Oliveira, Cincinnati, OH (US); Hernane Borges De Barros Pereira, Salvador-BA (BR); Fabíola De Lima Moreira, Salvador-BA (BR)

(73) Assignee: SAMSUNG ELECTRÔNICA DA AMAZÔNIA LTDA., Campinas-São Paulo (BR)

( * ) Notice: Subject to any disclaimer, the term of this patent is extended or adjusted under 35 U.S.C. 154(b) by 326 days.

(21) Appl. No.: 12/981,643

(22) Filed: Dec. 30, 2010

(65) Prior Publication Data
US 2012/0173700 A1 Jul. 5, 2012

(51) Int. Cl.
| | |
|---|---|
| *G06F 15/16* | (2006.01) |
| *G06F 9/445* | (2006.01) |
| *G06F 17/30* | (2006.01) |
| *G06F 9/45* | (2006.01) |
| *H04L 29/08* | (2006.01) |
| *G06F 9/44* | (2006.01) |
| *G06F 15/78* | (2006.01) |

(52) U.S. Cl.
CPC ............ *G06F 9/44505* (2013.01); *G06F 8/43* (2013.01); *G06F 9/4443* (2013.01); *G06F 17/30528* (2013.01); *H04L 29/08072* (2013.01); *G06F 15/7875* (2013.01)

(58) Field of Classification Search
CPC .......................................................... G06N 5/04
USPC .................. 370/310, 352; 709/224–225, 217
See application file for complete search history.

(56) References Cited

U.S. PATENT DOCUMENTS

| | | | | |
|---|---|---|---|---|
| 7,792,795 | B1 | 9/2010 | Swartz | |
| 7,813,822 | B1 * | 10/2010 | Hoffberg | ........................ 700/94 |
| 8,554,631 | B1 * | 10/2013 | Barton | .................. G06Q 20/20 |
| | | | | 705/16 |
| 2004/0172460 | A1 | 9/2004 | Marel | |

(Continued)

FOREIGN PATENT DOCUMENTS

WO  WO 2011150388 A1 * 12/2011

*Primary Examiner* — Aftab N. Khan
(74) *Attorney, Agent, or Firm* — Staas & Halsey LLP (57) ABSTRACT

The present invention provides a system that enhances the experience of using a portable device such as mobile phones, smart phones, Personal Digital Assistants PDA etc. To improve the user experience in the use of a portable device, techniques are used for "context characterization, i.e., from a range of conditions possible to detect by the system, such as time (date/time), current location, motion, etc., as well as the historical use of the device, a certain grouping of actions and settings, called "context" are selected automatically or manually, modifying and setting from that moment the way of user interacts with the device.

23 Claims, 7 Drawing Sheets

(56) References Cited

U.S. PATENT DOCUMENTS

| | | | |
|---|---|---|---|
| 2005/0015608 A1* | 1/2005 | Peterson | 713/193 |
| 2005/0049001 A1* | 3/2005 | Lazaridis | 455/552.1 |
| 2008/0005679 A1 | 1/2008 | Rimas-Ribikauskas | |
| 2008/0081605 A1* | 4/2008 | Cole | 455/424 |
| 2008/0092043 A1* | 4/2008 | Trethewey | G06F 1/1626 715/705 |
| 2008/0201350 A1 | 8/2008 | Thattil | |
| 2008/0249969 A1* | 10/2008 | Tsui | H02J 7/0055 706/46 |
| 2009/0002178 A1* | 1/2009 | Guday | A61B 5/0002 340/573.1 |
| 2009/0150545 A1* | 6/2009 | Flores et al. | 709/224 |
| 2009/0203352 A1* | 8/2009 | Fordon et al. | 455/406 |
| 2010/0011388 A1* | 1/2010 | Bull et al. | 725/9 |
| 2010/0325238 A1* | 12/2010 | Khedouri et al. | 709/217 |
| 2011/0113084 A1* | 5/2011 | Ramnani | G06Q 30/02 709/201 |
| 2011/0276396 A1* | 11/2011 | Rathod | 705/14.49 |
| 2012/0010867 A1* | 1/2012 | Eder | G06F 19/3437 703/13 |
| 2012/0303561 A1* | 11/2012 | Sathish | G06F 17/30873 706/14 |
| 2015/0200958 A1* | 7/2015 | Muppidi | H04L 41/28 726/23 |

\* cited by examiner

SYSTEM FOR ORGANIZING AND GUIDING A USER IN THE EXPERIENCE OF BROWSING DIFFERENT APPLICATIONS BASED ON CONTEXTS

TECHNICAL FIELD

The present invention relates to the field of human interaction with mobile devices, more specifically concerns a system to organize and guide a user experience in navigating between different applications based on context.

BACKGROUND OF THE INVENTION

The document U.S. 2008/0201350 (Context-Based Information Retrieval), published on Aug. 21, 2008, proposes a system and method for searching contextual information. The term "context" in accordance with the teachings of said document U.S. 2008/0201350 does not follow the same definition of the patent described here because it represents a combination of meta-data (or tokens) with other existing data. The object of said system is the medical field, particularly through diagnostics using images. In this field, the devices responsible for obtaining the images produce a huge amount of data that includes the function performed and the day on which the action occurred, errors, important and/or critical parameters, numerical results from sensors or a combination thereof. The document U.S. 2008/0201350 therefore offers an advanced search technique upon these data to optimize and simplify the detection of failures in maintenance of machines, using the "context" of the meta-data.

The document U.S. 2004/0172460 (Context Filter), published on Sep. 2, 2004, also proposes the assignment of meta-data to pre-existing data. In particular, the document U.S. 2004/0172460 describes methods for quickly searching to find the data through the metadata. The document U.S. 2004/0172460, however, after the detection of context, specifies only a "pointer" to the context in a database. In that document U.S. 2004/0172460, the end result includes a list of concepts common to the context identified.

The document U.S. 2008/0005679 (Context Specific User Interface), published on Jan. 3, 2008, proposes techniques that modify the operation of a device based on the context in which it is inserted. Examples of contextual attributes include the physical location of the device, an accessory connected to the device, some attribute related to connecting to a data network, any attribute linked to the behavior identified of use of the user, the execution state of other applications and/or the state of the user. Based on these contextual attributes, the software undergoes changes in order to adapt to the current context, with all configuration done through the contextual attributes of a remote computer, not forcing the user to make changes on the device itself.

The document U.S. Pat. No. 7,792,795, published on Sep. 7, 2010, presents a centralizing and pooling of resources, serving as a facilitator of access to data from other applications. Additionally, the term context in U.S. Pat. No. 7,792,795 refers only to data such as name, address, attributes of a person, a user's preferences, device data (e.g. GPS location), and so on. However, there is no reference to the control of hardware components.

SUMMARY OF THE INVENTION

The present invention provides a system that enhances the experience of using a portable device such as mobile phones, smartphones, Personal Digital Assistants PDA etc.

To improve the user experience in the use of a portable device, techniques are used for "context characterization, i.e., from a range of conditions possible to detect by the system, such as time (date/time), current location, motion, etc., as well as the historical use of the device, a certain grouping of actions and settings, called "context" are selected automatically or manually, modifying and setting from that moment the way of user interacts with the device.

For the purposes of the present invention, context is defined as a specific group of actions and settings that, once selected, defines the mode of user interacts with the device.

It is important to note that these characterization techniques are dynamic, i.e., they are subject to change and/or upgrades either through artificial intelligence techniques present in the device, but also by the user, the latter attending primarily to the fine adjustments, according to the preferred embodiment of the invention.

The present invention also provides a flexible architecture and modular software which includes a well-defined set of methods for integrating the concept of context with a system comprising: (1) access manager and centralizing to resources, acquisition module and automatic information processing by the portable device (Artificial Intelligence), module for associating metadata (tags) (Tagging Module), Mobile Web Server, information manager through which the web interface (extended manager), data Backup & Restore module and observer of event sources (Observers).

The present invention provides solutions to usability and graphical user interface that organize and guide the user experience in navigating between different applications on clear and well defined contexts. Once identified and assumed the context, a set of metadata (tags) are assigned to all events generated by the portable device.

This portable device allows a context is defined by user where settings and behaviors are attributed to events and metadata (tags). Settings can also occur automatically. Thus, the portable device demonstrates different executions based on contexts specifically assigned by the user or automatically identified by an artificial intelligence engine.

This portable device captures data automatically from the environment in which it is in operation, the data capture can be done through different sensors and applications on that device, as well as the events generated by actions that the user runs the device over the day.

This portable device also includes a web server that allows configuration of the same from an external browser. This component allows you to organize information from the device following the directives given by the user in the web service. It is also allowed to access and extract all data from that device, using this same server. Thus, the user has the option to access the data through a computer, modify and synchronize data with a PC and/or a remote web server, providing a more comfortable alternative to the user.

This portable device can also optionally communicate with a remote server on the web, securely, to synchronize the information on profiles and preferences, settings and data in a unique account of the user. This communication will allow the updating of configuration information, preferences and user data on the remote Web server if the user updates content on his portable device, as well as, it allows users to download ready contexts available in remote web server and shared by other users.

The present invention also allows restoring and backup information contained in said portable device such as images, videos, contacts, audio, programs, contexts of use, maps, and tags. In a particular way, this backup/restore is done using the information manager through web interface (extended manager).

The way the architecture developed is one of the different aspects of the present invention. Instead there are several different applications that work individually with a usability feature, having a centralized and scalable environment capable of adding new features and let them all communicate and interact. Thus, features such as backup and restore, extended device management via the web, context management, among others, are really only snapshots of a whole which are provided by the architecture.

BRIEF DESCRIPTION OF FIGURES

The objects and advantages of the present invention will become apparent from the following detailed description of an exemplary embodiment of the invention and attached drawings by way of non-limiting example, in which.

DESCRIPTION OF PREFERRED
EMBODIMENTS OF THE INVENTION

Figure 1:
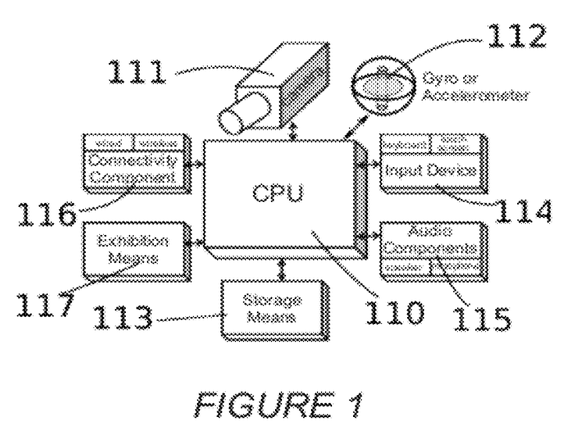
FIG. 1 illustrates a model in which the portable system can be implemented.

The hardware needed to bring the system of the present invention is a portable device, and its main features are illustrated in FIG. 1. The CPU 110 (Central Processing Unit) is responsible for executing the necessary instructions for the management of all sensors and device features, and evaluates events and take actions based on defined rules. For example, the camera 111 captures images and gyro or accelerometer 112 can set the orientation of the device and the type of movement. The storage medium 113 serves to store information and data, including location, sequence of events, among others. The hardware also consists of information input devices 114 and 115 audio components. Through some connectivity component 116 can communicate with the application and the services provided of synchronization and sharing of contexts. The display means 117 is required for viewing by the user of the change of context.

Figure 2:
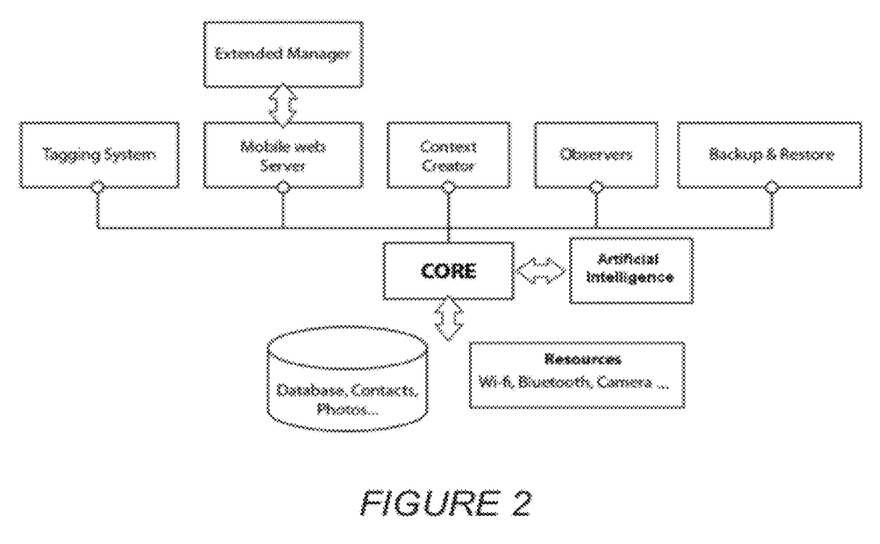
FIG. 2 shows the components of the architecture presented.

The architecture of the present invention, represented in FIG. 2, comprises the following main components: Core, Artificial Intelligence, Tagging System, Mobile Web Server, Extended Manager, context Creator, Observers and Backup & Restore. Each will be described below.

Core

The Core is the central component of the architecture. It is what makes the interface between the components and features of portable devices, such as databases and sensors. The Core was developed with the main objective of isolating the remaining portions (tagging system, mobile web server, extended manager, context creator, observers and backup & restore) from accessing these resources, thus ensuring that new added features to the devices can be used by those who share the architecture.

Another feature of the Core is to ensure that any changes to the application programming interface (Programinmg Application Interface—API) of resources of the device do not impact the applications that access architecture. This reduces the work of preparing the applications for each API version.

The Core uses a service based policy, all components or applications that communicate with it, do it through the consumption of one of the many services provided by the same.

Figure 3:
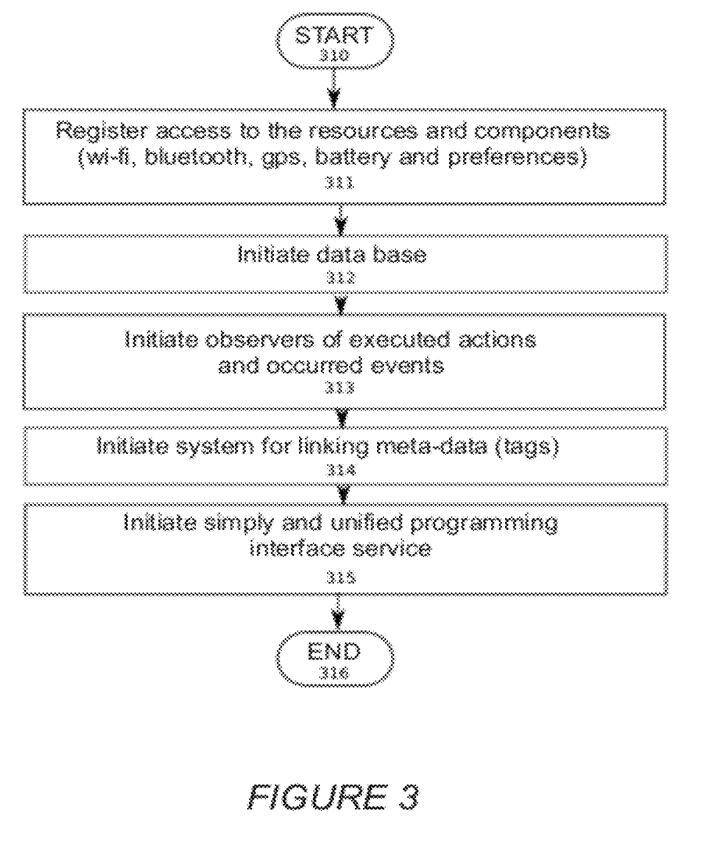
FIG. 3 shows the flow of operation of the Core.

FIG. 3 shows the flow of operation of the Core, as detailed below:

(310) The core is initially raised by the operating system;
(311) Core checks all components and features in your device. Next, it requires access to them in order to manage them;
(312) Core accesses a database that it uses to manage the metadata (tags) and resource use log of the device (e.g. applications, camera device). At this time, it initializes the database;
(313) Core System starts the observation of resource use of the device. All actions and events generated in the portable device can be observed. When an observable event is triggered, the Core performs the record in the database. Observers are started via concurrent threads that continuously monitor the features and components identified;
(314) With the observation system active, the Core starts the binding metadata (tags) system. When an event eligible to receive a tag is triggered (e.g. capture of photo), the observer notifies the Core to make sure that there is one or more active tags. The system has a standard tag, but allows the creation of a new one by the user. The context of the system can also provide new tags and these will be used to link information while it is active. The user can select as many tags as you wish to make the link information automatically when a resource is used.
(315) In order to simplify the development and integration of applications with the features and components of the system, it is started the unified and simplified programming interface service, which runs a remote interface to allow centralized access to managed resources;
(316) The service is available for access.

Observers

Observers are responsible for the sources of device events such as clock, accelerometer, gyroscope, camera, ring tones or use the applications installed on the portable device and others that may also exist. Observers analyze the actions taken by users and inform the Core so that it performs the required actions (e.g. adding a tag to a photo, registering the application use in a log).

The architecture allows the observation of any feature of the device, however, you can individually choose which events are monitored, avoiding thus unnecessary consumption of resources of the device.

Figure 4:
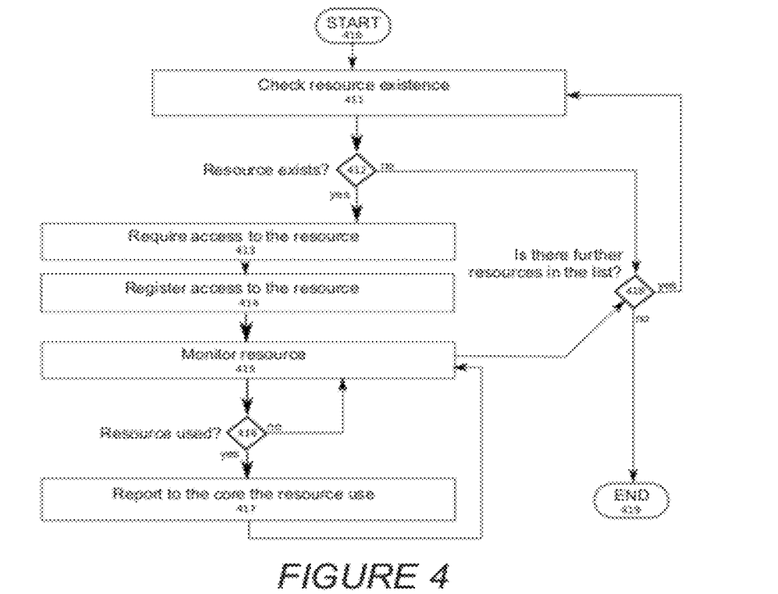
FIG. 4 details the actions taken by the observers of events.

FIG. 4 shows the flow of operation of the observers, as detailed below:

(410) The observation process is started;
(411) First the list is loaded with all the resources that can be observed. However, it is possible that it does not exist in a particular device, so it is necessary to verify its existence (412); if there is (418), the system search the next on the list (running again 411); otherwise, it starts to monitor the resources registered (419);
(413) If the resource exists, access to the same is requested;

(414) Having permission to access, it is performed the registration in the operating system so that it informs it about the events that occur on it;

(415) The resource is monitored and the system searches for a new feature in the list (418), if any, the process starts (411), otherwise the system will monitor only the resources that were recorded (419);

(416) After registering the resource monitoring (415), as soon as it is used (or accessed), the Observer reports on the event to the Core (417) and returns to its monitoring activity (415).

Mobile Web Server

Mobile Web Server provides an environment where applications created using web technologies are able to be arranged in the portable device (e.g. servlet). Just as a web server on a personal computer, it allows multiple applications to be installed and used simultaneously by multiple users. These applications in turn can be accessed through any device that has a web browser connected to the portable device via cable or data network.

Besides being responsible for allowing the use of web applications, the server is still responsible for access and security of information carried. For this, it deploys policies limiting access to applications and secure traffic information.

Figure 5:
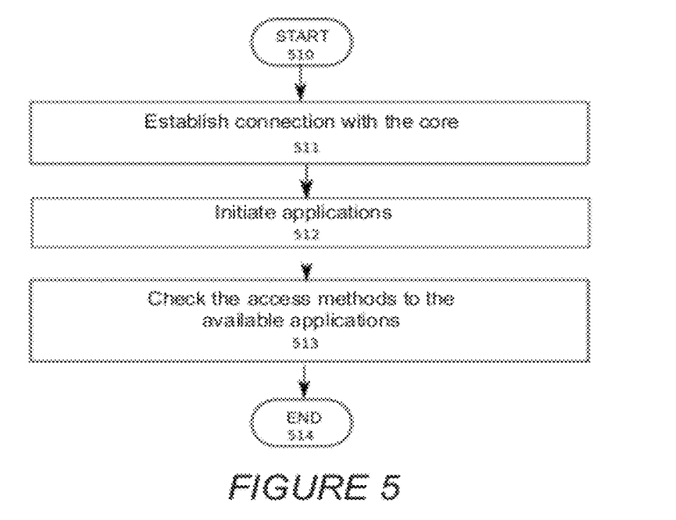
FIG. 5 shows the flow of operation of the Mobile Web Server.

FIG. 5 shows the flow of operation of the Mobile Web Server, as follows:

(510) Mobile Web Server is started;

(511) Mobile Web Server requests to open connection to the Core. When it is established, it receives from the Core its communication interface;

(512) Mobile Web Server starts web applications and transfers to them the connection interface with the Core;

(513) Mobile Web Server analyzes which are the possible ways to access other equipment applications (e.g. Wi-Fi, USB cable, 3G).

(514) Mobile Web Server becomes available for use;

Extended Manager

The extended Manager is a web application hosted in webserver of the portable device that allows to manage information and resources of the device through a web browser. Its purpose is to promote a new form of user interaction and make the experience of using the portable device more pleasant.

From the above extended manager, it is possible to:

display Information from the device (such as battery and signal level, available space on the memory card and on the device);

Effect settings (like changing volume, wallpaper and ringtone, enable or disable Wi-Fi and Bluetooth);

Manage contact information, messages, calls, images, videos and music;

Create or activate contexts already installed, besides performing actions native to device such as making a call and send a message;

Create new pages for managing other resources.

Because the architecture has a tagging system, application, through its access to the Core, is capable of filtering using this feature, in addition to presenting information on a map indicating where they were created or added to the portable device (e.g. capturing of a photo or adding a contact).

By using the backup API, the extended manager has an interface for performing backup and restore.

Context Creator

A context is defined by the user in which settings and behaviors are attributed to events and metadata (tags). Thus, the portable device shows different executions based on the context identified or assigned by the user. Thus, value is added to existing information to automatically associate all relevant events and actions in the portable device to metadata (tags).

The Context creator is the component that allows you to manage the contexts. You can perform from the process of creating and installing to the context activation and configuration. This component can be accessed through an application on the portable device, the computer accessing the service from the context creator by the browser on the portable device or through a widget application.

The contexts typically represent situations such as gym, school, car, work or home, but it can represent a specific situation such as a lecture, a movie or an event. According to the preferred embodiment of the invention, there are two types of contexts: the generic, which is created by users through the Creator and Premium context, that are contexts more advanced and usually take the form of applications.

Each context can represent a range of behaviors, content and applications that are commonly used in these situations. Thus, allowing a configuration and faster access to user needs in each of these moments.

Behaviors are actions that the context will run on the portable device while being activated and can be settings of the device as changing the state of Wi-Fi, Bluetooth, Wallpaper and volume or linking Tags to information generated by the portable device.

The content is information that will be linked to the context, such as photos, videos, music, documents, events and contacts. This capability to bind context information is important for the exchanging information between users. An example of this functionality is a context of a lecture, which could be linked to the day that the lecture will take place along with a presentation, photos and texts used in the lecture.

The context also allows grouping application, which represents a faster access to these applications when using a context. Another important advantage of this function is that the exchange between users, you can also share applications that are used in this context. The application file is not shared, but the address where the set of information/applications is stored, which allows the user that does have it, to download it.

Activation of contexts can be done manually or automatically. The user can choose to activate a context when you need it or make your schedule for it to be activated in specific situations, such as in reaching an area at a specific time or date, in connecting to a specific network or in activating a specific accessory to the device.

After the creation of contexts, it is possible to export them to share with other users. The file generated in the export process contains all the content present in context, as behaviors, content and applications.

In the process of installing of a context, all their information is reported to the user such as name and description, behavior, content and applications. When you install it, it is available for activation by the user.

Backup and Restore Module

One of the important features of the architecture of the present invention is a backup and restore system. Commonly such tools need an external software to be installed on your computer. Another common feature is that these tools are only able to backup and restore all information without allowing the user to individually select what he wants.

The system provided by the architecture described herein is available in the portable device and can be accessed through the extended Manager and does not require the user to perform any manual installation. It also allows all information likely to participate in a backup or recover can be chosen individually by the user.

Backup to the portable device is an activity that consumes battery, RAM memory and storage space. The proposed backup method uses a mechanism that checks the form that the user is using to access the backup feature. If it is by a web interface and the machine that is accessing has the necessary requirements, the system installs the backup application automatically in the user's machine, otherwise it uses the resources of the portable device itself.

Figure 6:
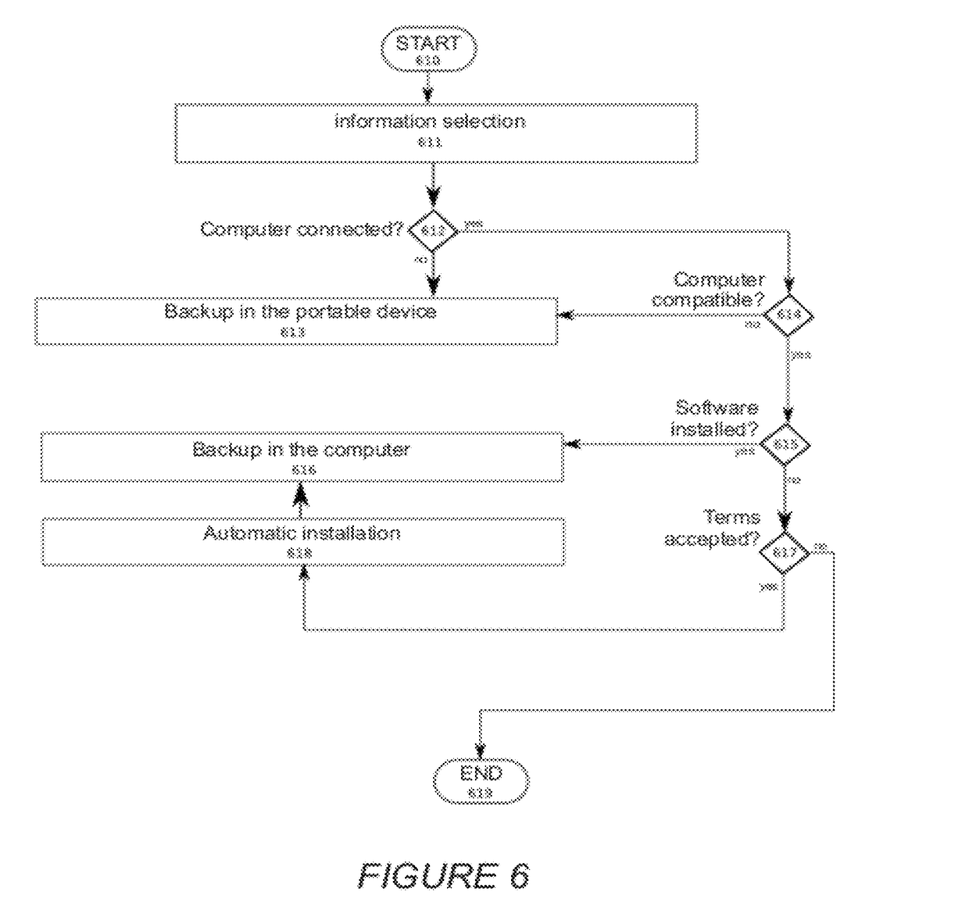
FIG. 6 shows the flow of operation of the Backup.

FIG. 6 shows the flow of operation of the backup, as follows:

(610) The user decides to backup information;

(611) The user selects all the information he wants to make backup (e.g. pictures, videos, contacts, audio, programs, contexts of use, maps, tags). This selection can be done individually, for example, choosing each contact individually, or total;

(612) The system checks whether the device is connected to a computer. If so, check if the machine that is accessing it meets the minimum requirements for the backup system can work from there (614). If not, the whole procedure will use the resources of portable device (613) itself;

(615) If the machine meets the minimum requirements, the system will check if it is already installed. If installed, the backup system will use the resources of the machine that is accessing (616);

(617) If the software is not installed, a license agreement appears. This term explains how the procedure works and what the software will do. If the user accepts the term, the software is automatically installed on the machine (618) and the system will use its resources (616), otherwise the system will use the resources of the portable device (613);

(619) The backup process is finished;

The main differences of this approach are:

1) All that is required for the backup is on the portable device. This does not oblige the user to be in possession of an installation CD so that he can make his backup;

2) If the machine you are accessing the system (it is possible to access it through the device itself) does not have the ability to perform the necessary procedures, the entire responsibility of the process is transferred to the device;

3) If the machine that is accessing the system has the capacity to perform the necessary procedures, all responsibility will be transferred to the same. The great advantage is that it will consume much less resources and processing power.

The generated file has been thought in order to be independent of the operating system on which it was created. Thus, it is possible to generate a backup on an operating system and import it into another. The restore method is similar to backup. If you run a restore, the system informs the user that exists within the file and the user can choose what information they want to restore. The system takes care to prevent duplication of data.

Figure 7:
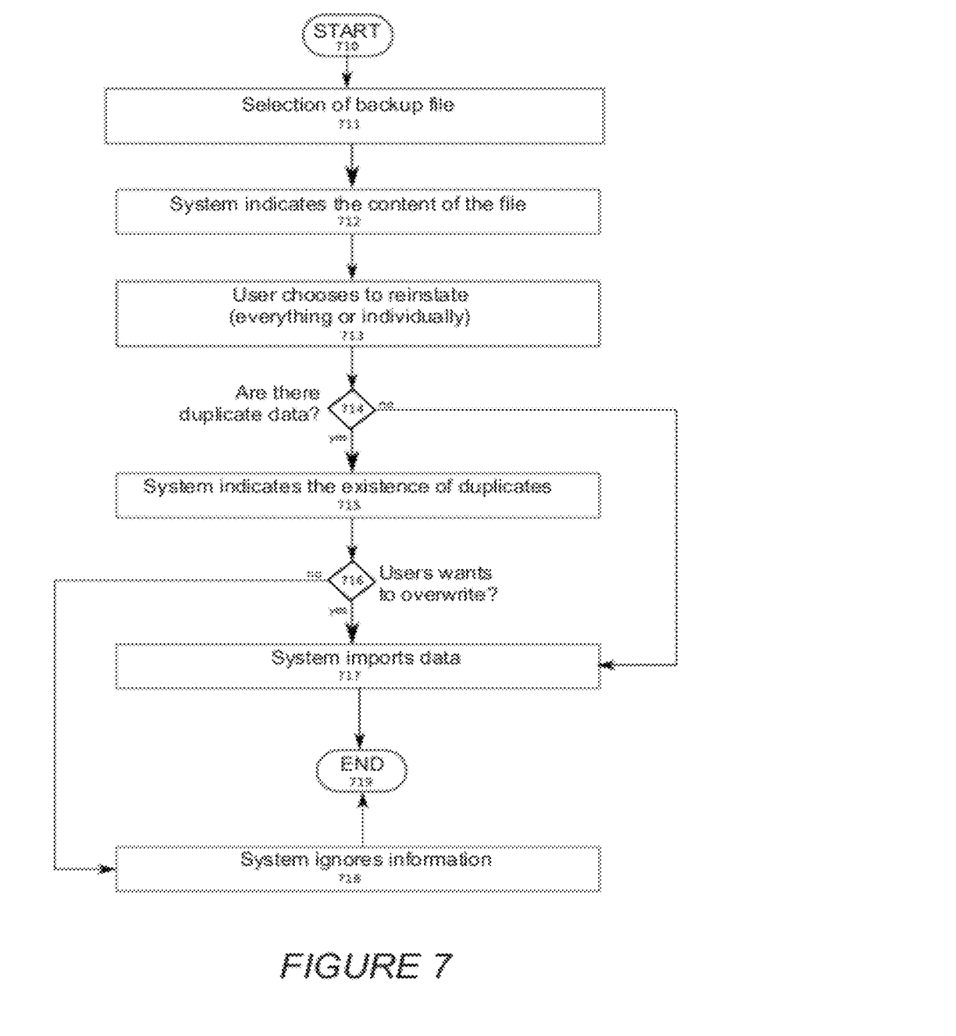
FIG. 7 shows the flow of operation of the Restore method.

FIG. 7 shows the flow of operation of the Restore method, as detailed below:

(710) The user decides to restore information;

(711) The user selects the backup file from which to retrieve;

(712) The system informs the information which exist in the file (e.g. photos, contacts, videos);

(713) The user selects what they want to restore. You can select individual or import all the information;

(714) The system checks whether the information to be imported already exist on the portable device. If not, the import is made (617);

(715) When a conflict occurs, the system informs all the information you have already registered and there are prompts the user for permission to rewrite (716). If the user accepts, the information is overwritten (717), otherwise the system ignores (718);

(719) The restore process is finished;

Tagging Module

Figure 8:
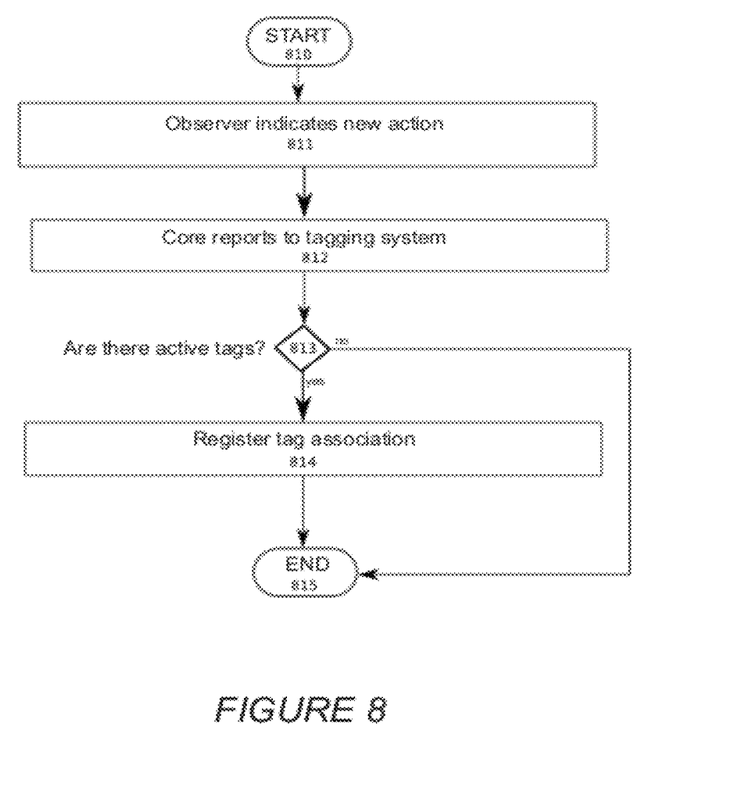
FIG. 8 shows the flow of operation of the tagging system.

The architecture allows essential information (e.g. photos, videos, contacts, music, messages, calls) of the portable device to be associated with a metadata (tag). The advantage of adding a tag to information is the ability to recover more quickly. FIG. 8 shows the flow of operation of the tagging system as explained below:

(810) The Tagging module is started;

(811) When an action is taken, the observer is notified;

(812) The observer notifies the tagging module and checks if it exists tag (s) active;

(813) If there is one or more active tags, the system makes the link with the resource (814). For example, if a picture is taken and there is a tag "birthday" of the system will link it to the photo. Data such as date, time, latitude and longitude are also added to the binding, thus allowing the user to locate on a map where the photo was taken; If there are active tags, the system does not perform any action;

(815) The Tagging module expects the new service;

Mechanism of Artificial Intelligence

The architecture of the present invention has a module that allows suggesting to the user events or situations that may be useful to him. To give the portable device the ability to collect environmental data at regular intervals of time, a mechanism for Artificial Intelligence (IEA) is embedded in the device.

The input data will be obtained by capturing the sound when taking a picture, the current time, the device ID and signal strength, GPS receiver, compass, light sensor and on any input sensor and information online or offline or device available.

The record of the actions taken by the user of the device will also be interpreted as input data for the mechanism of Artificial Intelligence (IEA).

After a preset amount of data that were acquired, the IEA will process it and the core will have one or more actions.

Each time a process is done, the device will update knowledge of EIA and the results makes the decisions of the next iteration more accurate and linked to the user's actions.

This process becomes more accurate for each new interaction with the device has with the environment and the user, learning from each interaction how to act better and more efficiently. Over time, the device will be able to predict almost the next interaction the user will run and will be promptly prepared for it.

By analyzing the volume, ringtone, color settings, wallpaper, a rhythm of walking, external sounds, etc the IEA can, for example, identify the mood of the user.

Suggestions that the IEA could make the user for a better experience when using the portable device are for example:

Go to a specific context;

Change the wallpaper or screensaver (the IEA can identify the default screen saver and wallpaper through color depth and chromium information to suggest new content that may match the user's preferences or mood);

Change the order of the contact list according to location and other standards;

Start an application;

Present a personal assistant who will perform tasks within the software environment of the device;

Contact or notify a specific person, distribution list, or emergency service by email or SMS or MMS.

Set up an application for change in mood or music preferences;

If the IEA considers that the device is at risk of being stolen (by sounds and patterns of accelerometer), it may allow the password prompt to unlock the phone. If the situation in which the device detects that it is being stolen becomes common and the user has to unlock it regularly, the IEA will store it and the device will prevent the lock on these situations again.

If the device detects that it is falling in the water (also by the accelerometer and sound patterns, and other possible sensors) that it can perform an emergency stop to avoid further damage to the circuits.

Figure 9:
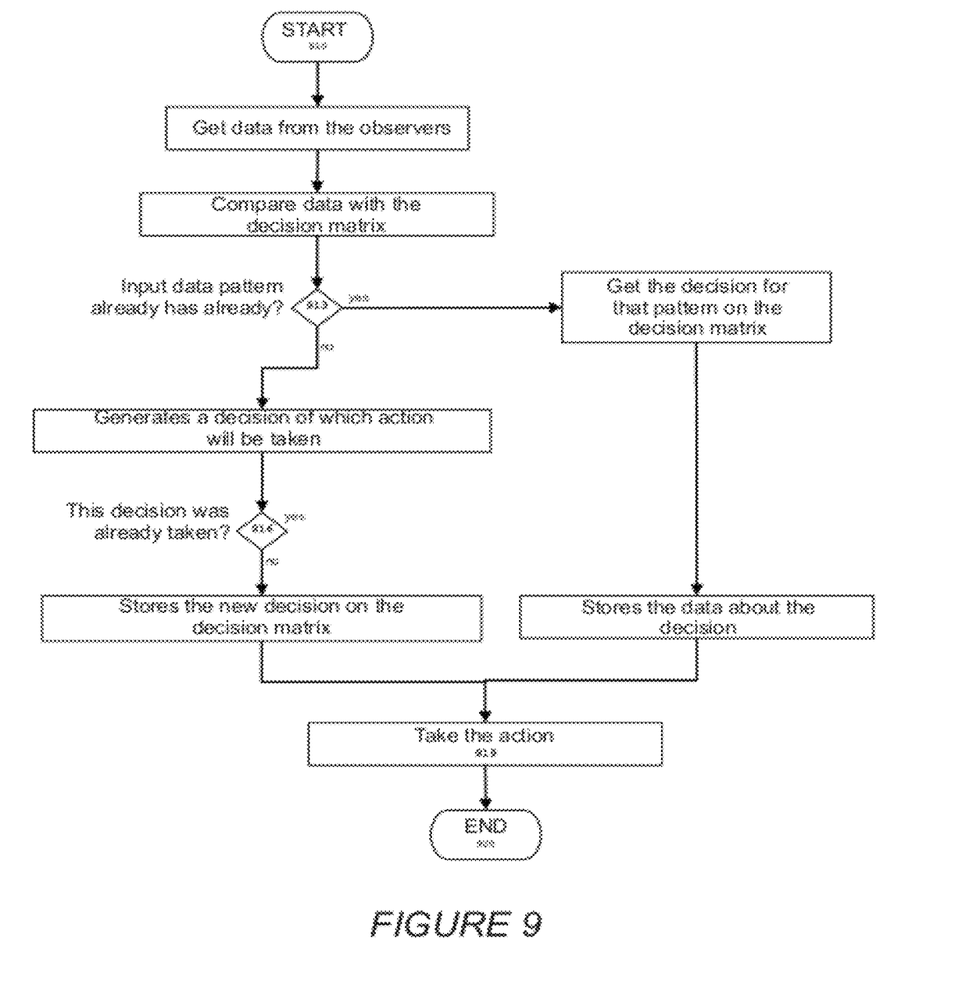
FIG. 9 shows the stages of artificial intelligence.

FIG. 9 represents the main flow of interaction within the artificial intelligence component, as detailed below:

(910) Artificial intelligence is initiated soon after the signals from the core of the observers that there is data to be processed and action to be taken.

(911) Observer data are taken. Artificial intelligence will convert this data into a format that allows a fast and accurate comparison with the data stored in the database of the decision matrix. These will be temporarily stored in a buffer that represents the data types of the decision matrix and the structure of the database.

(912) A number of queries will be executed on the decision matrix to combine the buffered data. A list of the closest matches and the decision is created.

(913) If an exact match is found in the previous query (912), there is no need for additional processing, so that a prompt action can be taken in accordance with the previously learned behavior (914). If this is not the case, the list was created in the query with the data in the buffer will be supplied to the artificial intelligence engine, to generate a new answer to the current situation (915).

(914) Some time before an action has been taken in accordance with the same data that are in the buffer. So, a decision on this has already been made, no further processing needs to be done. The decision matrix is queried to obtain the exact actions that need to be taken.

(915) The data in the buffer list and corresponding data are fed into the artificial intelligence engine, and a new decision in accordance with this information will be generated.

(916) If this new decision (915) corresponds to a previously stored in the matrix, artificial intelligence will add information about the data that led to this decision in the decision matrix. Thus, precision and speed of the actions will be improved (918). If the decision is a new fact, it is added to the database of the main decision, expanding the knowledge map of the artificial intelligence engine (917).

(917) as a new decision was taken, add this new type of decision into the matrix, to add precision and broaden the possible responses of the devices according to the environment.

(918) in the log of the decision matrix, add 1 to the number of times this specific decision was taken. This number can increase the accuracy of responses and will be used as input for the next actions to be taken.

(919) effectively take action in accordance with the decision returned from the artificial intelligence engine.

(920) End of the decision process and awaiting the next signal of the core.

Although a preferred embodiment of the present invention is shown and described, those skilled in the technical will understand that various modifications can be made without departing from the spirit and scope of the present invention, as defined in the appended claims.

It is also expressly stated that all combinations of elements that perform the same function in substantially the same way to achieve the same results are within the scope of the present invention.

The invention claimed is:

1. A system in a portable device for enhancing a user experience based on a dynamic context characterization of the portable device, the system comprising:

a Central Processing Unit (CPU) for executing an artificial intelligence engine and an instruction regarding management of a sensor and a feature of the portable device, evaluating an event, and taking an action based on at least one of a defined policy and a rule;

an application programming interface (API) for providing a flexible architecture and at least one of a modular software component and an application to organize and guide the user experience in navigation between different applications;

an observer component that monitors at least one of event sources of the portable device and use of the applications installed on the portable device including checking for active metadata for at least one resource;

a mobile web server that provides an environment where the applications created using web technologies are arrangeable in the portable device;

an extended manager that is a web application hosted in the mobile web server that allows managing information and resources of the device through a web browser;

a context creator that allows the management of the dynamic context characterization, that involves creating, installing, activating, and configuring context;

a backup and restore module in the portable device and accessible through the extended manager that does not require a user to perform any manual installation and allows the user to individually select what information to backup or restore;

a tagging module containing the information for the portable device that is associated with the metadata of the at least one resource, and when a new action is indicated by the observer component, the system making the link with the at least one or more resources and registering tag association when there is one or more active tags;

a core component interfacing between the tagging module, components and features of portable devices, such as databases and sensors wherein the core isolates the observer, mobile web server, extended manager, context creator, backup and restore module, tagging module, and artificial intelligence engine from other components in the portable device, so that all the communication is routed through the core component; and an artificial intelligence engine for converting data received from the core and temporarily storing in a buffer that represents the data types of the decision matrix and the structure of the database, wherein the artificial intelligence engine executes a query on the decision matrix to combine the buffered data, creates a list of the closest matches, and when an exact match is found in the query, takes a prompt action in accordance with previously learned context characterization, otherwise the list created in the query with the data in the buffer is supplied to the artificial intelligence engine, for generating a new decision to the current context characterization, and wherein the artificial intelligence engine selectively adds a decision to a decision matrix database, logs the number of times the decision was made for broadening the possible responses of the portable device according to the environment and suggesting useful events or situation to the user, and identifies a mood of the user based on at least one of a volume, ringtone, color setting, wallpaper, walking rhythm, and external sound of the portable device.

2. The system as in claim 1, wherein the core component ensures that any changes to the application programming interface (API) resources of the portable device do not impact the applications that access architecture.

3. The system as in claim 1, wherein the core component uses a policy based on services, and all components or the applications communicate with it through the consumption of one of the services.

4. The system as in claim 1, wherein the observer component analyzes the actions taken by users to inform the core to perform the necessary actions.

5. The system as in claim 1, wherein the user individually chooses which events are monitored to avoid unnecessary consumption of resources of the portable device.

6. The system as in claim 1, wherein with the use of web applications, a server is responsible for access and security of the information carried through the implementation of policies limiting access to the applications and secure traffic information.

7. The system as in claim 1, wherein the extended manager is configured to:
  display the information from the portable device battery and signal level, available space on the memory card and on the device;
  effect settings comprising changing volume, wallpaper, and ringtone, or enabling or disabling Wi-Fi and Bluetooth;
  manage contact information, messages, calls, images, videos and music;
  create or activate the contexts already installed, and perform actions native to the portable device, wherein the actions comprise making a call and sending a message; and
  create new pages for managing other resources.

8. The system as in claim 1, wherein the context creator is accessible by an application on the portable device, by the computer accessing the service from the context creator in the portable device through a browser, or by a Widget application.

9. The system as in claim 1, wherein the context includes situations consisting of gym, school, car, work, or home.

10. The system as in claim 1, wherein the context includes a specific situation consisting of a lecture, a movie, or an event.

11. The system as in claim 1, wherein the content is the information that will be linked to the context, comprising photos, videos, music, documents, events, and contacts.

12. The system as in claim 1, wherein the context also allows grouping applications.

13. The system as in claim 1, wherein the activation of the context is done manually or automatically.

14. The system as in claim 1, wherein the input data for the artificial intelligence engine are obtained by capturing the sound when taking a picture, the current time, the portable device ID and signal strength, GPS receiver, compass, light sensor and on any input sensor and the information online or offline or portable device currently available.

15. The system as in claim 1, wherein the record of actions taken by the user of the portable device will also be interpreted as the input data for the Artificial Intelligence engine (IEA).

16. The system as in claim 1, wherein the information from the portable device comprises battery and signal level, available space on the memory card and on the device.

17. The system as in claim 1, wherein the settings includes changing volume, wallpaper and ringtone, enable or disable Wi-Fi and Bluetooth.

18. The system as in claim 1, wherein multiple applications are installed and used simultaneously by multiple users.

19. The system, according to claim 18, wherein the applications are accessed through any device that has the web browser connected to the portable device via cable or data network.

20. The system as in claim 1, wherein each context represents a range of behaviors, content, and the applications.

21. The system as in claim 20, wherein the behaviors are actions that the context will run on the portable device upon being activated and are settings of the portable device to change the state of Bluetooth, Wallpaper, and volume or linking Tags to the information generated by the portable device.

22. The system as in claim 1, wherein after creating the context, it is possible to export them to share with other users.

23. The system as in claim 22, wherein the file generated in the export process has the extension "czf" of a Context Zip File, and contains all the content in this context, the behaviors, the content, and the applications.

* * * * *

UNITED STATES PATENT AND TRADEMARK OFFICE
CERTIFICATE OF CORRECTION

PATENT NO. : 9,575,776 B2
APPLICATION NO. : 12/981643
DATED : February 21, 2017
INVENTOR(S) : Tiago Silveira De Andrade Cajahyba et al.

It is certified that error appears in the above-identified patent and that said Letters Patent is hereby corrected as shown below:

On the Title Page

Item [Assignee] (73):
Column 1, Line 1, Delete "ELECTRÔNICA" and insert --ELETRÔNICA--, therefor.

Item [Abstract] (57):
Column 2, Line 5, Delete ""context" and insert --"context"--, therefor.

In the Claims

Column 12, Lines 31-32, (Claim 15, Lines 3-4), Delete "Artificial Intelligence engine (IEA)" and insert --artificial intelligence engine--, therefor.

Column 12, Line 35, (Claim 16, Line 3), Delete "card" and insert --card,--, therefor.

Column 12, Line 52, (Claim 21, Line 4), After "state of", insert --Wi-Fi,--, therefor.

Signed and Sealed this
First Day of August, 2017

Joseph Matal
*Performing the Functions and Duties of the*
*Under Secretary of Commerce for Intellectual Property and*
*Director of the United States Patent and Trademark Office*